United States Patent [19]
Brodhacker

[11] 3,743,931
[45] July 3, 1973

[54] STORAGE BATTERY TESTING DEVICE
[76] Inventor: John W. Brodhacker, c/o ESB, P.O. Box 8109, Philadelphia, Pa. 19101
[22] Filed: Aug. 10, 1971
[21] Appl. No.: 170,578

[52] U.S. Cl.................... 324/29.5, 320/48, 340/249
[51] Int. Cl...................... G01n 27/42, H01m 31/04
[58] Field of Search.................. 324/29.5; 340/249; 320/48; 307/10

[56] References Cited
UNITED STATES PATENTS
3,424,979  1/1969  Stocker............................. 324/29.5
3,594,642  7/1971  Wright.............................. 324/29.5

Primary Examiner—Rudolph V. Rolinec
Assistant Examiner—Ernest F. Karlsen
Attorney—Robert H. Robinson et al.

[57] ABSTRACT

A testing device for determining the cranking ability of a storage battery under simulated low temperature conditions is described. The device imposes an auxiliary load on the battery during an engine cranking operation at normal temperature. The auxiliary load is approximately equivalent to the combined effect on the battery and engine of low temperature. Battery condition is determined by its ability to crank motor with the additional load.

8 Claims, 3 Drawing Figures

Patented July 3, 1973  3,743,931

INVENTOR.
JOHN W. BRODHACKER 3,743,931

STORAGE BATTERY TESTING DEVICE

BACKGROUND OF THE INVENTION

1. Field of the Invention

This invention relates to means for testing storage batteries. In particular, it relates to means for normal temperature testing internal combustion engine starting batteries to predict their behavior under winter temperature conditions.

2. Description of the Prior Art

The electrical requirements for cranking internal combustion engines at winter temperatures are well known to be more severe than the requirements at summer temperatures. One cause of the increased difficulty in cranking is traceable to the increased viscosity of the engine oil at low temperatures and results in a reduced cranking speed. The reduced cranking speed in turn means that there is more compression leakage and hence, lower peak compression pressure. Modern oils presently available fortunately show less change in viscosity than oils available in the past. However, winter temperatures also have a depressing effect on the storage battery used to crank the engine. The effect is shown by reduced electrical ampere hour capacity along with a reduction in operating voltage at any given discharge rate. A secondary effect of low temperatures on the storage battery is to make the charging of the battery more difficult. On the other hand, low temperatures reduce the stand losses of batteries so that they do not run down by themselves at low temperatures nearly as rapidly as they do at normal temperatures.

A starting failure under winter conditions can be a most trying experience to the automobile user. It is most difficult to obtain alternate transportation and it is also most difficult to obtain the necessary technical assistance to get the automobile back in running order.

Means are needed for anticipating battery failure prior to the time it occurs. Many inventors have studied the problem and many devices have been proposed for checking the anticipated low temperature performance of batteries prior to the onset of cold weather.

It has been recognized that the voltage performance of a battery discharged at a particular current and temperature is similar to the voltage performance of the same battery discharged at a second temperature and a properly selected second current. Thus, devices have been used to predict the performance of a battery on discharge at low temperature by discharging the battery at normal temperature at a suitable higher current rate and measuring the resulting battery voltage. In another class of device, the tester discharges the battery at a fixed high current rate and the voltage is compared to a norm for the particular battery size and the temperature at which the test is run. Other combinations of test voltage and test current with temperature correction factors have been developed.

In all these devices, the test results are shown on a meter. The meter reading does not relate directly with the experience of the car owner for his experience of battery performance is based upon the actual feel of the car motor during the cranking and starting cycle.

SUMMARY OF THE INVENTION

A battery tester is described which adds an additional electrical load equal to the effect of a low temperature cranking cycle to the battery during a normal temperature cranking cycle. The starting ability of the battery at low temperature is guaged from the ability of the battery to crank the motor under the simulated conditions. The tester of the invention is applied directly to the battery in the car, enabling the test to be made rapidly and at the command of the vehicle operator. Because the test is made on the car, it also will indicate malfunction or incipient malfunction of other components of the vehicle taking part in the starting operation. A meter may be added so as to give a numerical value to the test.

DESCRIPTION OF THE PREFERRED EMBODIMENTS

Figure 1:
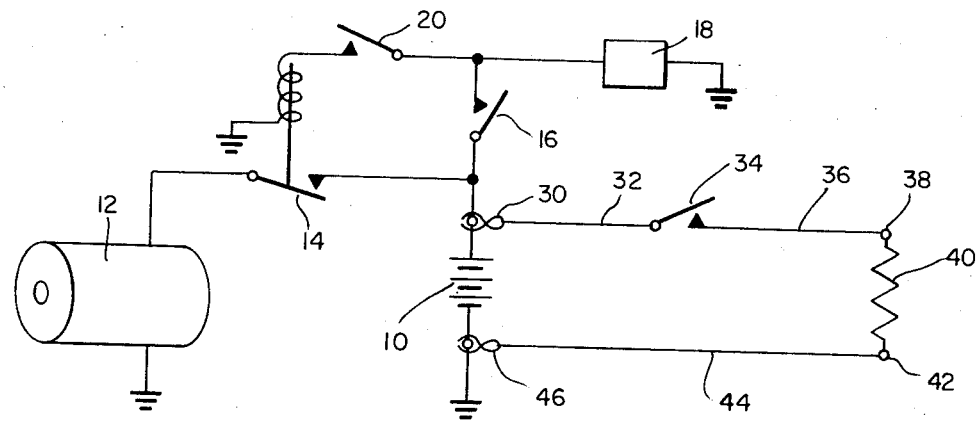
FIG. 1 shows a schematic diagram of a simple form of the invention.

FIG. 1 depicts the invention in its simplest form. A vehicle battery 10 is shown connected to a cranking motor 12 via a starter relay 14. An ignition switch 16 connects the battery 10 to the ignition system 18 and to a starting switch 20. The starting switch 20 often made a part of the ignition switch 16 controls the starting relay 14. This is the normal circuit as used in present day motor cars. The test circuit comprises the following: a spring clip 30 connected by a cable 32 to a knife switch 34; the switch 34 is connected by a cable 36 to a first terminal 38 of a load resistor 40; a second terminal 42 of the load resistor is connected by cable 44 to a second spring clip 46; and spring clips 30 and 46 are attached to the terminals of the battery 10. To perform a battery test, the vehicle operator closes the ignition switch 16 and the starter switch 20, closing starting relay 14. At the same time, a test operator closes the manual switch 34. The combined loads of the starter 12 and the resistor 40 are thus placed across the battery.

The size of resistor 40 is chosen so that when the battery 10 is in an acceptable condition and at normal or first temperature, its operating voltage under the combined load of the starting motor 12 and the resistor 40 is about the same as when the battery is connected to the starting motor alone and both battery and motor are cold or at a second temperature lower than the first. Under the test conditions, the battery may indicate one of three conditions:

a. It may crank and start the motor — it is then in satisfactory shape.

b. It may fail to crank the motor at all in which case, the battery is definitely substandard.

c. It may have sufficient power to crank the motor in a marginal fashion. This will be apparent to the vehicle operator who can then decide whether the battery is useable for a period of time or whether it is marginal to the point of replacement.

In the simplest form of tester, only a single size of test resistor 40 is used. It has been found that the car manufacturers try to supply their vehicles with a battery properly sized but not overly large for the motor to which it is attached. This provides a self-regulating feature for the tester and enables the single size of resistor to be used to test all sizes of battery installations. Assuming a summer temperature of 80°F and a winter temperature of −10°F, a suitable size for the resistor would be a resistance of 0.025 ohms (including the resistance of the conductors 32, 36 and 44 and the switch 34. This permits a current flow of about 260 amperes at an average cranking voltage of about 6.5. To the drain of 260 amperes must be added the cranking motor drain of about 200 – 400 amperes, depending on the motor size.

Figure 2:
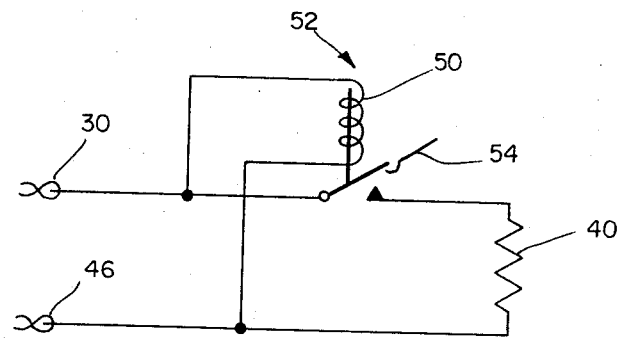
FIG. 2 shows a schematic diagram of a more refined form of the invention.

The circuit described above is the simplest form of the invention. A first improvement is to replace the knife switch 34 by a load resistor relay. There are several means in which the load resistor relay can be made to close when the starter motor relay is closed. One means is to connect the coil of the load resistor relay in parallel with the coil of the starter motor relay 14 using a load and a spring clip. In this circuit, both relays close when the starter switch is closed. In a second control circuit, a low voltage relay is used. This circuit is shown in FIG. 2. The operating coil 50 of low voltage load relay 52 is connected by spring clips 30 and 46 to the battery terminals. When the battery is on open circuit, and its voltage is high, the relay is held open by the coil 50. However, when the starter is connected across the battery, its voltage is depressed and the relay 52 opens and the load of resistor 40 is added to the battery.

It will be noted that when the operator connects the test device to the car battery by means of the spring clips 30 and 46, there will be a moment during which current flows in the resistor 40 before the coil 50 of relay 52 is energized. This is a somewhat dangerous condition and there may be sparking while the operator makes good contact with the spring clips. To avoid this hazard, relay 52 can be equipped with a manual latch-out as shown at 54. This latch-out opens and holds the relay contacts open at the will of the operator even though the coil is not energized.

In a third form of control circuit, a voltage drop sensing circuit is used to measure the battery voltage and control the closing of the load resistor relay.

A further refinement to the circuit uses a variable load resistor instead of the fixed resistor shown at 40. The variable resistor can be calibrated for ambient battery and motor temperature as well as for motor size. In another modification, a voltage measuring means to measure the voltage supplied to the load is provided.

It is apparent that under the conditions of the test, the battery is operating under extreme conditions of load. This is sufficient to over-discharge the battery in a rather short time and might cause hardship to the user of the vehicle under test. To protect against over-discharge, a fixed period timing device can be included in one of the circuits controlling the closing of the load relay so that the resistive load is applied to the battery for a predetermined time interval such as a few seconds.

When the test unit is equipped with a timing device, a further feature of the test unit appears. If under test the engine starts before the timing period is spent, the battery-engine combination is ready for winter weather whereas, if it does not start within the timing period, the cold weather starting ability is at best definitely marginal. Thus, the timing device itself becomes a means for guaging on a simplified go-no-go basis the starting ability of the battery motor combination.

Figure 3:
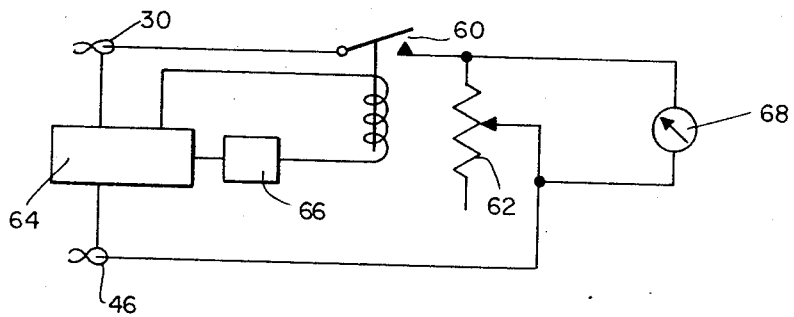
FIG. 3 shows a schematic diagram of a third embodiment of the invention.

FIG. 3 shows a circuit embodying the several refinements discussed above. A load relay 60 connects variable resistance 62 across the terminal clips 30 and 46.

A low voltage sensing device 64 is also connected across the terminals 30 and 46. This sensing device supplies an actuating current to relay 60 when the terminal voltage of the battery to which terminals 30 and 46 are attached is substantially less than the open circuit voltage of the battery. A simple timing cut out device such as a thermal relay 66 is shown located in one of the leads of the load relay 60. A final refinement of the circuit of FIG. 3 is a voltmeter 68, in this case connected across the load resistor. It will be observed that with the circuit of FIG. 3, when terminal clips 30 and 46 are disconnected, no power is available to close relay 60 and thus, the load circuit is open. When clips 30 and 46 are attached to a battery on open circuit, the low voltage sensor 64 senses high voltage, and no current is fed to relay 60. When the battery voltage is depressed by the cranking of the internal combustion engine with which the battery is associated, relay 60 immediately closes, allowing for the test. When the test has run the required time of, say, 5 to 10 seconds, the load relay is automatically cut out by the action of timer 66, thus preventing undue drain on the battery.

Variable resistor 62 is set in accordance with tables or curves so as to give the correct current drain in conformity with the ambient engine temperature and the engine size, make, etc. As long as relay 60 is open, voltmeter 68 will show no voltage. However, when connected as shown, as soon as relay 60 closes, voltmeter 68 will show a voltage. A high voltage reading will indicate good battery condition and a low voltage, poor battery condition. Other ways of connecting the voltmeter may be used, such as connecting directly across the battery terminals, etc.

Although an automobile engine has been referred to in the above description, the invention is not limited to automobile engines alone but is suitable for testing the starting ability of all types of internal combustion engines whether fixed or portable, and using spark or compression ignition.

Having described my invention and given an example of its embodiment, I hereby claim:

1. A device for simulating the cranking ability at a second temperature of a storage battery connected to and used for cranking an internal combustion engine when both battery and engine are at a first temperature, the second temperature being lower than the first temperature, which comprises:
   a. a resistive load operatively connectable across the terminals of the battery, the value of the resistive load being such that the voltage of the battery, with both cranking and resistive load, is substantially equal to the voltage of the battery when the battery is cranking the engine alone and both the engine and battery are at the second temperature; and
   b. means for operatively connecting the resistive load across the terminals of the battery which comprises:
      1. voltage sensing means connected to the battery terminals for sensing a low voltage, and
      2. a load relay operatively connected to the low voltage sensing means and to the resistive load.

2. A device as defined in claim 1 in which the means for operatively connecting the load resistance to the battery comprises a low voltage sensing means connected to the battery terminals and a load relay operatively connected to the low voltage sensing means.

3. A device as described in claim 1 in which the means for operatively connecting the load relay to the battery terminals includes a timing means operative to open the load relay after a predetermined time interval.

4. A device as described in claim 1 in which the means for operatively connecting the load resistance to the battery comprises a low voltage relay, the coils of which are operatively connected to the terminals of the battery.

5. A low temperature storage battery cranking load simulator which comprises:
   a. a low voltage sensing means connected across the terminals of a storage battery, the storage battery being located within an automobile and electrically connected to the electrical circuits thereof, comprising a starting motor circuit and an ignition circuit;
   b. a load resistor connectable by a relay means to the terminals of the storage battery, the resistance of the load resistor having a value such that when the battery at a summer temperature is electrically connected to the starting motor circuit and the ignition circuit and the load resistor is connected to the terminals of the battery, the combined current flow from the battery depresses the battery voltage to a value that simulates the voltage of the battery when the battery and the automobile are at a winter weather temperature;
   c. the relay means operatively connected to the low voltage sensing means; and,
   d. guaging means for guaging the ability of the battery to crank the automobile engine, the arrangement being such that when the automobile and the battery are at a summer temperature and when the automobile starter and the automobile ignition circuits are connected to the battery, a voltage drop occurs therewithin causing the low voltage sensor to connect via the relay the load resistor across the terminals of the battery and thus in turn causing the terminal voltage thereof to substantially simulate the terminal voltage of the battery when the battery is connected to the starter circuit and the ignition circuit and the battery and the automobile are at a winter weather temperature.

6. A low temperature storage battery cranking load simulator as defined in claim 5 in which the guaging means includes a fixed period timing device.

7. A low temperature storage battery cranking load simulator as defined in claim 5 in which the guaging means includes a battery voltage measuring means.

8. A low temperature storage battery cranking load simulator as defined in claim 5 in which the load resistor is a variable resistance.

* * * * *